(12) United States Patent
Murayama

(10) Patent No.: US 10,148,128 B2
(45) Date of Patent: Dec. 4, 2018

(54) POWER-SUPPLYING DEVICE, AND WIRELESS POWER-SUPPLYING SYSTEM

(71) Applicant: IHI CORPORATION, Tokyo (JP)

(72) Inventor: Takahiko Murayama, Tokyo (JP)

(73) Assignee: IHI CORPORATION, Tokyo (JP)

( * ) Notice: Subject to any disclaimer, the term of this patent is extended or adjusted under 35 U.S.C. 154(b) by 228 days.

(21) Appl. No.: 14/833,286

(22) Filed: Aug. 24, 2015

(65) Prior Publication Data

US 2015/0364947 A1 Dec. 17, 2015

Related U.S. Application Data

(63) Continuation of application No. PCT/JP2014/056783, filed on Mar. 13, 2014.

(30) Foreign Application Priority Data

Jun. 14, 2013 (JP) ................................. 2013-125855

(51) Int. Cl.
H02J 7/00 (2006.01)
H02J 50/12 (2016.01)
H02J 5/00 (2016.01)
H02J 7/02 (2016.01)
H02M 7/5387 (2007.01)
H02M 1/32 (2007.01)
(Continued)

(52) U.S. Cl.
CPC .............. H02J 50/12 (2016.02); H02J 5/005 (2013.01); H02J 7/025 (2013.01); H02M 1/32 (2013.01); H02M 1/4225 (2013.01); H02M 3/33569 (2013.01); H02M 7/53871 (2013.01); H02M 2001/007 (2013.01); H02M 2001/0058 (2013.01); Y02B 70/126 (2013.01); Y02B 70/1491 (2013.01)

(58) Field of Classification Search
USPC ........................................................ 320/108
See application file for complete search history.

(56) References Cited

U.S. PATENT DOCUMENTS 5,670,833 A * 9/1997 Mengelt ................... H02J 9/06
307/64
6,430,069 B1 * 8/2002 Drobnik ................... G06F 1/26
320/108
(Continued)

FOREIGN PATENT DOCUMENTS

CN 101573851 A 11/2009
JP 08-080042 A 3/1996
(Continued)

OTHER PUBLICATIONS

International Search Report, PCT/JP2014/056783, dated Apr. 15, 2014, 2 pgs.

Primary Examiner — Samuel Berhanu

(57) ABSTRACT

A power-supplying device including an inverter circuit, a resonance circuit connected to the inverter circuit and configured to transfer alternating current power to a power-receiving device in a wireless manner, and a switching control unit that adjusts a parameter of respective switching signals that control ON and OFF of respective switching elements constituting the inverter circuit so that an inter-terminal voltage of a specific element constituting the inverter circuit or the resonance circuit does not exceed a predetermined limit value.

7 Claims, 4 Drawing Sheets

(51) Int. Cl.
*H02M 1/42* (2007.01)
*H02M 3/335* (2006.01)
*H02M 1/00* (2006.01)

(56) References Cited

U.S. PATENT DOCUMENTS

| | | | |
|---|---|---|---|
| 8,004,235 B2 | 8/2011 | Baarman et al. | |
| 8,593,105 B2 | 11/2013 | Baarman et al. | |
| 8,872,472 B2 | 10/2014 | Baarman et al. | |
| 9,035,501 B2 | 5/2015 | Azancot et al. | |
| 9,048,696 B2 | 6/2015 | Azancot et al. | |
| 9,083,204 B2 | 7/2015 | Azancot et al. | |
| 9,136,734 B2 | 9/2015 | Azancot et al. | |
| 2007/0058404 A1 | 3/2007 | Yaguchi | |
| 2008/0079392 A1* | 4/2008 | Baarman | H02J 7/0072 320/108 |
| 2011/0062793 A1 | 3/2011 | Azancot et al. | |
| 2011/0221391 A1* | 9/2011 | Won | H01M 10/44 320/108 |
| 2011/0222651 A1* | 9/2011 | Ogawa | H02M 7/53871 378/20 |
| 2011/0267002 A1 | 11/2011 | Baarman et al. | |
| 2012/0001593 A1* | 1/2012 | Di Guardo | H02J 7/025 320/108 |
| 2012/0242283 A1* | 9/2012 | Kim | H02J 5/005 320/108 |
| 2014/0021911 A1 | 1/2014 | Baarman et al. | |
| 2014/0125146 A1 | 5/2014 | Azancot et al. | |
| 2014/0125147 A1 | 5/2014 | Azancot et al. | |
| 2014/0252871 A1 | 9/2014 | Azancot et al. | |
| 2015/0263537 A1 | 9/2015 | Azancot et al. | |
| 2015/0326032 A1 | 11/2015 | Azancot et al. | |

FOREIGN PATENT DOCUMENTS

| | | |
|---|---|---|
| JP | 10-014139 A | 1/1998 |
| JP | 2000-152620 A | 5/2000 |
| JP | 2003-018847 A | 1/2003 |
| JP | 2004-236395 A | 8/2004 |
| JP | 2004-266921 A | 9/2004 |
| JP | 2005-006459 A | 1/2005 |
| JP | 2005-237117 A | 9/2005 |
| JP | 2010-252446 A | 4/2010 |
| JP | 2011-514801 A | 5/2011 |
| JP | 2001-345191 A | 12/2011 |

* cited by examiner

POWER-SUPPLYING DEVICE, AND WIRELESS POWER-SUPPLYING SYSTEM

This application is a Continuation of International Application No. PCT/JP2014/056783, filed on Mar. 13, 2014, claiming priority based on Japanese Patent Application No. 2013-125855, filed on Jun. 14, 2013, the contents of both International Application and the Japanese Application are incorporated herein by reference in their entirety.

BACKGROUND

Field of the Disclosure

The present disclosure relates to a power-supplying device, and a wireless power-supplying system.

Description of Background Art

Japanese Unexamined Patent Application, First Publication No. 2010-252446 discloses a wireless power-supplying system capable of simplifying a power-supplying device and a power-receiving device. In this wireless power-supplying system, the power-supplying device estimates a distance between its own primary self-resonance coil and a secondary self-resonance coil of the power-receiving device and controls supply of electric power depending on the distance. Thus, it is not necessary to estimate the distance by performing communication with the power-receiving device. That is, since a communication function is not necessary, configurations of the power-supplying device and the power-receiving device can be simplified. Further, as a related technology, Japanese Unexamined Patent Application, First Publication No. 2005-006459 discloses a wireless power device in which prevention of damage of a part of a power-receiving device or prevention of heat generation in the part is achieved when a load of the power-receiving device is in an open state or when the power-receiving device is used in a low-load state. A load detection and power transfer control device detects whether a load to be connected to the power-receiving device is a non-load or a low load, and decreases an oscillation frequency of an oscillation circuit of the power transfer device to a predetermined value when the load is non-load or a low load. Accordingly, it is possible to decrease an output voltage of the power-receiving device and prevent adverse effects due to abnormality of the load. Further, as another related art, Japanese Unexamined Patent Application, First Publication No. H08-080042 discloses a technology capable of preventing a resonance voltage VC from exceeding a breakdown voltage level of an FET or the like, and preventing voltage damage or lifespan shortening of an element since a resonance voltage VC can be made constant even when a level of a load has changed.

SUMMARY

In the related art, the power-supplying device includes a plurality of elements, such as a resonance coil (the above primary self-resonance coil), a resonance capacitor, or a reactor used as a filter. In these elements, a characteristic variation of each product lot in production or a characteristic variation caused by a temperature change in a use environment occurs, or a change in induction of the resonance coil according to a distance from a magnetic flux shielding material such as aluminum arranged around an installation place occurs. Therefore, in the related art, there is a possibility that characteristics of the circuit are changed, an unexpected voltage is applied to each element, and the element is damaged.

The present disclosure is made in view of the above-described circumstances, and an object thereof is to prevent damage of an element.

According to a first aspect of the present disclosure, there is provided a power-supplying device, including: an inverter circuit; a resonance circuit connected to the inverter circuit and configured to transfer alternating current power to a power-receiving device in a wireless manner; and a switching control unit configured to adjust a parameter of respective switching signals that control ON and OFF of respective switching elements constituting the inverter circuit so that an inter-terminal voltage of a specific element constituting the inverter circuit or the resonance circuit does not exceed a predetermined limit value.

According to a second aspect of the present disclosure, there is provided a power-supplying device, including: a voltage converter which receives power based on power supplied from outside; an inverter circuit connected to the voltage converter; a resonance circuit connected to the inverter circuit and configured to transfer alternating current power to a power-receiving device in a wireless manner; and a switching control unit configured to control the voltage converter or the inverter so that an inter-terminal voltage of a specific element constituting the voltage converter circuit, the inverter circuit, or the resonance circuit does not exceed a predetermined limit value, in which the switching control unit configured to perform at least one of adjusting a transformation ratio of the voltage converter so that the inter-terminal voltage does not exceed a predetermined limit value, and adjusting a parameter of respective switching signals that control ON and OFF of respective switching elements constituting the inverter circuit.

According to a third aspect of the present disclosure, there is provided a wireless power-supplying system, including: a power-supplying device including an inverter circuit, a first resonance circuit connected to the inverter circuit and configured to transfer alternating current power to a power-receiving device in a wireless manner, and a switching control unit configured to adjust a parameter of respective switching signals that control ON and OFF of respective switching elements constituting the inverter circuit so that a first inter-terminal voltage of a specific element constituting the inverter circuit or the first resonance circuit does not exceed a predetermined limit value; a second resonance circuit configured to receive the alternating current power from the power-supplying device in a wireless manner; and a rectification circuit connected to second resonance circuit and configured to supply power to a battery.

According to the present disclosure, it is possible to prevent damage of the element of the power-supplying device by performing control so that the inter-terminal voltage of the element of the power-supplying device does not exceed the limit value.

DETAILED DESCRIPTION OF THE DISCLOSURE

First Embodiment

A first embodiment of the present disclosure will be described with reference to the drawings. A schematic configuration of a wireless power-supplying system according to the embodiment is disclosed in FIG. 1. Further, details of a part of a power-supplying device S are described in FIG. 3.

Figure 1:
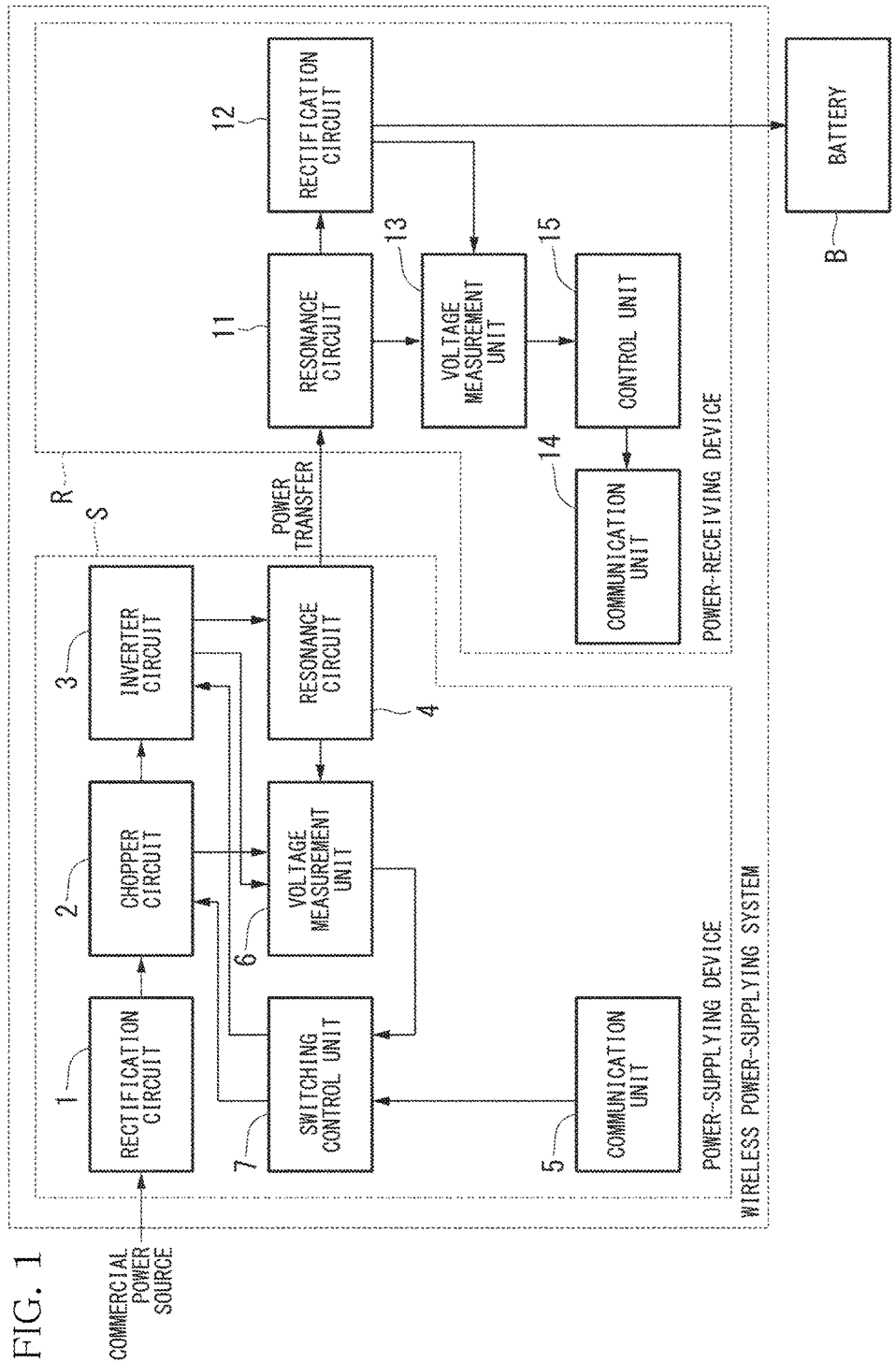
FIG. 1 is a block diagram showing a functional configuration of a wireless power-supplying system according to an embodiment of the present disclosure.

The wireless power-supplying system according to the embodiment includes a power-supplying device S, and a power-receiving device R, as shown in FIG. 1. Further, as shown in FIG. 1, the power-supplying device S includes a rectification circuit 1, a chopper circuit (voltage converter) 2, an inverter circuit 3, a resonance circuit 4, a communication unit 5, a voltage measurement unit 6, and a switching control unit 7. Meanwhile, the power-receiving device R includes a resonance circuit 11, a rectification circuit 12, a voltage measurement unit 13, a communication unit 14, and a control unit 15.

Further, the communication unit 5 is a receiving means in this embodiment. Further, the communication unit 14 is a transmission means in the present embodiment. Further, the switching control unit 7 is a control means in the present embodiment.

The power-supplying device S is a device that is fixedly arranged in a power-supplying facility provided on the ground and supplies alternating current power to a movable body in a wireless manner, and a direct current power is supplied to a battery (load) B. The power-supplying facility is a facility in which a single vehicle stop space or a plurality of vehicle stop spaces for a movable body are provided, and includes power-supplying devices S corresponding to the number of vehicle stop spaces. Meanwhile, the power-receiving device R is a device that is included in the movable body, converts the alternating current power supplied from the power-supplying device S into direct current power, and accumulates electric power. Further, the movable body is, for example, a vehicle requiring power reception from the outside, such as an electric vehicle or a hybrid vehicle.

The rectification circuit 1 in the power-supplying device S is, for example, a diode bridge, and full-wave-rectifies commercial power (for example, a single-phase of 100 volts, 50 Hz) supplied from an external commercial power source and supplies resultant power to the chopper circuit 2. The power (full-wave-rectified power) supplied from the rectification circuit 1 to the chopper circuit 2 is a pulsating current with a single polarity (for example, positive polarity) in which a sinusoidal commercial power is turned back at zero-crossing points.

Figure 3:
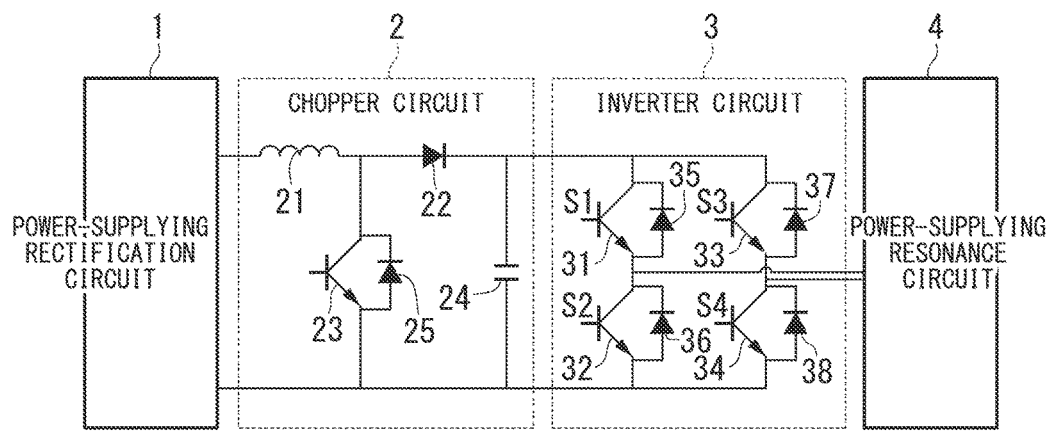
FIG. 3 is a diagram showing a configuration of an inverter circuit of a power-supplying device of the wireless power-supplying system according to the embodiment of the present disclosure.

A switching operation of the chopper circuit 2 is controlled by the switching control unit 7. Thus, an output voltage of the chopper circuit 2 is adjusted and supplies the output voltage to the inverter circuit 3. Specifically, an example of the chopper circuit 2 includes a boos chopper circuit 2 as shown in FIG. 3. Further, the chopper circuit 2 may be a buck-boost chopper circuit, but description will be given here using an example of a boost chopper circuit. The chopper circuit 2 includes a coil 21, a transistor (switching element) 23 that is connected to the coil 21 and performs an ON and OFF operation based on a control signal (switching signal) from the switching control unit 7, a diode 22 connected to the coil 21, and a capacitor 24 connected to the diode 22. The switching control unit 7 supplies the switching signal to the transistor (switching element) 23 included in the chopper circuit 2. The switching element is repeatedly turned ON and OFF by the switching signal from the switching control unit 7. As a result, an electromotive force is generated in the coil 21, and an input voltage directed to the chopper circuit 2 is boosted. Further, the voltage boosted by the coil 21 is smoothed by the capacitor 24 and supplied as a direct current voltage to the inverter circuit 3 of a subsequent stage. Briefly, the chopper circuit 2 is a boost chopper circuit or a buck-boost chopper, and either boosts, or boosts and drops the power received from the rectification circuit 1, and supplies the resultant power. The power supplied from this chopper circuit 2 is a direct current power obtained by sufficiently smoothing the full-wave-rectified power being a pulsating current by a function as an inductor of the coil 21 in the chopper circuit 2 and a function as a smoothing capacitor of the capacitor 24.

Further, this chopper circuit 2 functions as a power factor correction circuit (PFC: Power Factor Correction) through its switching operation being controlled by the switching control unit 7. That is, the chopper circuit 2 performs switching based on the zero-cross point of the full-wave-rectified power at a sufficiently higher frequency than the frequency of the full-wave-rectified power, and thus, the flow period of the current of the full-wave-rectified power is widened and the power factor is improved. Further, generally, since the chopper circuit is known to function as a power factor correction circuit, a detailed description of a power factor correction principle of the chopper circuit 2 is omitted here.

By the switching operation being controlled by the switching control unit 7, the inverter circuit 3 converts the direct current power supplied from the chopper circuit 2 into alternating current power at a specific frequency (transfer frequency) and supplies the alternating current power to the resonance circuit 4. For example, the inverter circuit 3 may be the circuit shown in FIG. 3. A principle of the inverter circuit 3 will be described in detail using the circuit shown in FIG. 3 so as to better illustrate the principle. The inverter circuit 3 includes transistors 31 and 32 connected in series, and transistors 33 and 34 connected in series. The transistors 31 and 32 form one leg (a first leg), and the transistors 33 and 34 form another leg (second leg). The transistor 31 receives a switching signal S1 from the switching control unit 7. The transistor 32 receives a switching signal S2 from the switching control unit 7. The transistor 33 receives a switching signal S3 from the switching control unit 7. The transistor 34 receives a switching signal S4 from the switching control unit 7. Further, the transistors may be transistors capable of constituting the inverter circuit, such as bipolar transistors or field effect transistors. Further, diodes 35 to 38 are feed-back diodes. When the inverter circuit has an inductive load and the respective transistors 31 to 34 are in the OFF state, the diodes 35 to 38 form a path for a current.

Each of the switching signals S1 to S4 is a rectangular wave signal (PWM signal) in which a voltage value indicating a high level and a voltage value indicating a low level are repeated. Based on the respective switching signals S1 to S4, the respective transistors 31 to 34 are switched between an ON state and an OFF state. For example, when each of the switching signals S1 to S4 is at a high level, each of the transistors 31 to 34 is the ON state and flows a current, and when each of the switching signals S1 to S4 is at a low level, each of the transistors 31 to 34 is the OFF state, have high resistance, and flows no current. However, a relationship between the high level or the low level indicated by the switching signals S1 to S4 and ON or OFF of the transistors 31 to 34 may be well known to vary depending on types of the transistors, such as an n-type or p-type.

Figure 4:
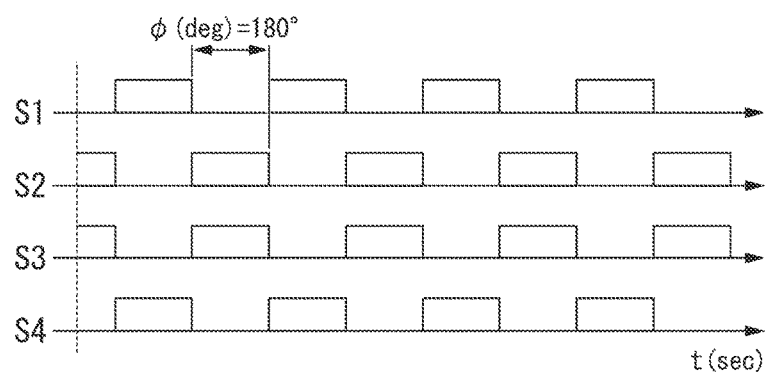
FIG. 4 is a diagram showing a timing of switching of the inverter circuit of the power-supplying device of the wireless power-supplying system according to the embodiment of the present disclosure.

FIG. 4 is a specific example of waveforms of the switching signals S1 to S4 that the switching control unit 7 supplies to the respective transistors 31 to 34. In this example, since a phase difference φ of the switching signal S1 and the switching signal S3 is 180°, the switching signal S1 and the switching signal S4 are in phase, and the switching signal S2 and the switching signal S3 are in phase. Further, the phase difference φ of the switching signal S1 and the switching signal S2 is 180° in order to prevent a through current from flowing through the transistors 31 and 32. Further, a phase difference φ of the switching signal S3 and the switching signal S4 is 180° in order to prevent a through current from flowing through the transistors 32 and 34. Also, the direct current voltage smoothed by the capacitor 24 of the chopper circuit 2 is supplied to the inverter circuit 3, and a current according to the waveforms of the switching signals S1 to S4 flows. In the example shown in FIG. 4, a current flows from the transistor 31 to the transistor 34 via the inside of the resonance circuit 4 in a period in which the switching signal S1 and the switching signal S4 are at the high level, and a current flows from the transistor 33 to the transistor 32 via the inside of the resonance circuit in a period in which the switching signal S2 and the switching signal S3 are at the high level. Since directions of the currents differ in the period in which the switching signal S1 and the switching signal S4 are at the high level and the period in which the switching signal S2 and the switching signal S3 are at the high level, the direct current voltage received from the chopper circuit 2 is converted into an alternating current voltage.

In the resonance circuit 4, a power-supplying coil and a power-supplying capacitor are connected. Among the power-supplying coil and the power-supplying capacitor, the power-supplying coil is provided in a position facing a specific position (a place at which a power-receiving coil is provided) of the movable body that has stopped at the vehicle stop space. Further, a resonance frequency of the resonance circuit 4 is set to the same or substantially the same frequency as a driving frequency (switching frequency) of the inverter circuit 3.

The communication unit 5 is provided in the power-supplying device 5, and performs near field wireless communication with the communication unit 14 of the power-receiving device R. Thus, the communication unit 5 acquires state information indicating a state of the power-receiving device R from the communication unit 14. For example, this state information is information indicating an inter-terminal voltage of an element (for example, a switch element, a coil, or a capacitor) constituting the resonance circuit 11 or the rectification circuit 12. Here, elements whose inter-terminal voltage should be included in the state information is determined based on the breakdown voltage of the elements to be taken care of. Therefore, the element whose inter-terminal voltage is included in the state information is not limited to the element constituting the resonance circuit 11 or the rectification circuit 12, but may include all elements whose breakdown voltage should be considered.

Such a communication unit 5 supplies the state information acquired from the communication unit 14 to the switching control unit 7. Further, a communication scheme for the communication unit 5 and the communication unit 14 is near field wireless communication such as ZigBee® or Bluetooth®, or near field optical communication using an optical signal.

The voltage measurement unit 6 is a voltage sensor that detects an inter-terminal voltage of a specific element (for example, the switching element, the coil, or the capacitor) constituting the chopper circuit 2, the inverter circuit 3, or the resonance circuit 4, and supplies a voltage detection signal indicating the inter-terminal voltage to the switching control unit 7. Specifically, the voltage measurement unit 6 detects the inter-terminal voltage of the element that has a breakdown voltage to be taken care of, and measures, for example, a voltage that is applied to the capacitor 24 included in the chopper circuit 2 and the capacitor included in the resonance circuit 4. Whether a voltage applied to a certain element is to be measured may be determined as necessary on design, and is not particularly limited. For example, in addition to the voltage applied to the capacitor 24, or the capacitor of the resonance circuit 4, the voltage measurement unit 6 may detect a voltage applied to the coil 21, the diode 22, and the transistor 23 included in the chopper circuit 2, and further detect a voltage applied to the transistors 31 to 34 included in the inverter circuit 3. Further, the voltage measurement unit 6 may detect a voltage applied to a coil constituting the resonance circuit 4.

The switching control unit 7 controls the inverter circuit 3 based on the state information of the power-receiving device R that the switching control unit 7 receives from the communication unit 5 or the voltage detection signal that the switching control unit 7 receives from the voltage measurement unit 6. For example, the switching control unit 7 adjusts a parameter of the switching signals S1 to S4 configured to control ON and OFF of the switching elements constituting the inverter circuit 3 so that the inter-terminal voltage of the element indicated by the voltage detection signal does not exceed the limit value based on the voltage detection signal that the switching control unit 7 receives from the voltage measurement unit 6. In an example of the adjustment, for example, the switching control unit 7 adjusts the respective frequencies (switching frequency) of the switching signals S1 to S4.

Here, impedance Zinv1 from the input of the inverter circuit 3 to the resonance circuit 4 or impedances Zinv2 from output of the inverter circuit 3 to the resonance circuit 4 has frequency characteristics in which its absolute value or phase is changed according to a frequency. When the switching control unit 7 changes the frequencies of the switching signals S1 to S4, the switching frequencies of the transistors 31 to 34 are changed, and as a result, the impedance Zinv1 or Zinv2 is also changed. As a result, the value of a current flowing through a system including the chopper circuit 2, the inverter circuit 3, and the resonance circuit 4 connected in series is changed. Thus, when the value of the current decreases as a result of adjusting the frequencies of the switching signals, the value of the inter-terminal voltage of a predetermined element also decreases.

Accordingly, when the switching control unit 7 adjusts the parameter of the switching signals S1 to S4, it is possible to prevent the inter-terminal voltage of the element of the chopper circuit 2, the inverter circuit 3, or the resonance circuit 4 from exceeding the limit value. Further, as a result, it is possible to decrease the inter-terminal voltage of the element constituting the power-receiving device.

Further, whether to increase or decrease the frequencies of the switching signals S1 to S4 depends on a circuit configuration of the chopper circuit 2, the inverter circuit 3, and the resonance circuit 4. This is because frequency characteristics of the above-described impedance depend on the circuit configuration.

Further, another example of the adjustment of the parameter of the switching signal will be described below. Further, the switching control unit 7 also controls the switching frequency of the transistor 23 included in the chopper circuit 2 which receives a switching signal from the switching control unit 7, and this example will be described below. Here, in other words, the switching frequency is a frequency of a fundamental alternating current wave supplied from the inverter circuit.

Meanwhile, the resonance circuit 11 in the power-receiving device R is a resonance circuit in which a power-receiving coil and a power-receiving capacitor are connected. The power-receiving coil is provided in the bottom, a side, the top, or the like of the movable body, and closely faces the power-supplying coil of the power-supplying device S when the movable body stops in the vehicle stop space.

In such a resonance circuit 11, the power-receiving coil closely faces the power-supplying coil of the resonance circuit 4 to be magnetically coupled to the power-supplying coil of the resonance circuit 4. As a result, the resonance circuit 11 receives the alternating current power supplied to the power-supplying coil by the inverter circuit 3 and the alternating current power according to a coupling coefficient between the power-supplying coil and the power-receiving coil from the resonance circuit 4 in a wireless manner, and supplied the received power to the rectification circuit 12.

The rectification circuit 12 includes, for example, a diode bridge, a reactor (coil), and a smoothing capacitor, and full-wave-rectifies and smoothes the alternating current power (received power) supplied from the resonance circuit 11 and supplies the resultant power to the battery B. The power supplied from the rectification circuit 12 to the battery B is direct current power obtained by smoothing the power full-wave-rectified by the diode bridge using the reactor and the smoothing capacitor.

The voltage measurement unit 13 is a voltage sensor that detects an inter-terminal voltage of a specific element (for example, the switching element, the coil, or the capacitor) constituting the resonance circuit 11 or the rectification circuit 12, and supplies a voltage detection signal indicating the inter-terminal voltage to the control unit 15. The voltage measurement unit 13 detects the inter-terminal voltage of the element that has a breakdown voltage to be taken care of. Whether a voltage applied to which element is to be measured may be determined as necessary on design, and is not particularly limited.

The communication unit 14 is provided in the power-receiving device, and transmits the state information indicating the state of the power-receiving device R by performing near field wireless communication with the communication unit 5 of the power-supplying device S. For example, this state information is information indicating the inter-terminal voltage of the element (for example, the switching element, the coil, the capacitor, or the like) constituting the resonance circuit 11 or the rectification circuit 12. The communication unit 14 performs radio wave communication such as ZigBee (registered trademark) or Bluetooth (registered trademark) or optical communication using an optical signal, similarly to the communication unit 5. Elements whose inter-terminal voltage should be transmitted by the communication unit 14 as state information are determined based on the breakdown voltage of the elements to be taken care of. Therefore, the element whose the inter-terminal voltage is included in the state information is not limited to the element constituting the resonance circuits 11 or the rectification circuit 12, but may include all elements whose breakdown voltage should be considered.

The control unit 15 performs overall control of the power-receiving device R. For example, although details will be described below, the control unit 15 supplies the inter-terminal voltage of the element indicated by the voltage detection signal received from the voltage measurement unit 13 to the communication unit 14 as the state information of the power-receiving device R. Also, the communication unit 14 transmits this state information to the communication unit 5 provided in the power-supplying device, as described above.

The battery B is a secondary battery such as a lithium ion battery, and is charged with the direct current power supplied from the rectification circuit 12 to accumulate power. Although not shown, this battery B is connected to an inverter circuit (traction inverter circuit) that drives a traction motor of the movable body or/and to a control device that controls the traveling of the movable body, and supplies driving power to the traction inverter circuit or to the control device.

Next, an operation of the wireless power-supplying system configured in this way will be described in detail with reference to FIG. 2.

When the movable body enters the vehicle stop space, this wireless power-supplying system starts the supply of power to the movable body. For example, the communication unit 5 of the power-supplying device S continues to transmit a communication request signal at constant periods. Meanwhile, when the movable body enters the vehicle stop space, the communication unit 14 of the power-receiving device R can receive the communication request signal, and thus, transmits a response signal to the communication request signal to the communication unit 5. Also, when the communication unit 5 receives the response signal, the communication unit 5 notifies the switching control unit 7 of the reception of the response signal. As a result, the switching control unit 7 determines (recognizes) that the movable body has entered an area in which power can be supplied.

Also, the switching control unit 7 adjusts the switching frequency of the inverter circuit 3 so that the inter-terminal voltage of the element indicated by the voltage detection signal does not exceed the limit value based on the voltage detection signal that the switching control unit 7 receives from the voltage measurement unit 6. For example, the voltage measurement unit 6 measures the voltage that is applied to each of the coil 21 and the capacitor 24 of the chopper circuit 2 and the transistors 31 to 34 of the inverter circuit 3. Further, the voltage measurement unit 6 measures the voltage that is applied to the power-supplying coil and the power-supplying capacitor of the resonance circuit 4. Also, the switching control unit 7 adjusts the frequencies of the switching signals S1 to S4 that are supplied to the inverter circuit 3 so that a value of the voltage applied from the voltage measurement unit 6 to each element does not exceed the limit value (the switching frequency is adjusted). Here, the limit value described above refers to a maximum value of the inter-terminal voltage at which a specific element is not damaged. Alternatively, the limit value refers to a value equal to or smaller than the maximum value of the inter-terminal voltage at which a specific element is not damaged.

Further, even when the inter-terminal voltage of the element has exceeded the limit value, the switching control unit 7 adjusts the switching frequency of the inverter circuit 3 so that the inter-terminal voltage of the element is below the limit value. Thus, by changing the switching frequency of the inverter circuit 3 to change the impedance, the inter-terminal voltages of the coil 21 and the capacitor 24 of the chopper circuit 2, the respective transistors 31 to 34 of the inverter circuit 3, and the power-supplying coil and the power-supplying capacitor of the resonance circuit 4 can be adjusted so as not to exceed the limit value.

Figure 2:
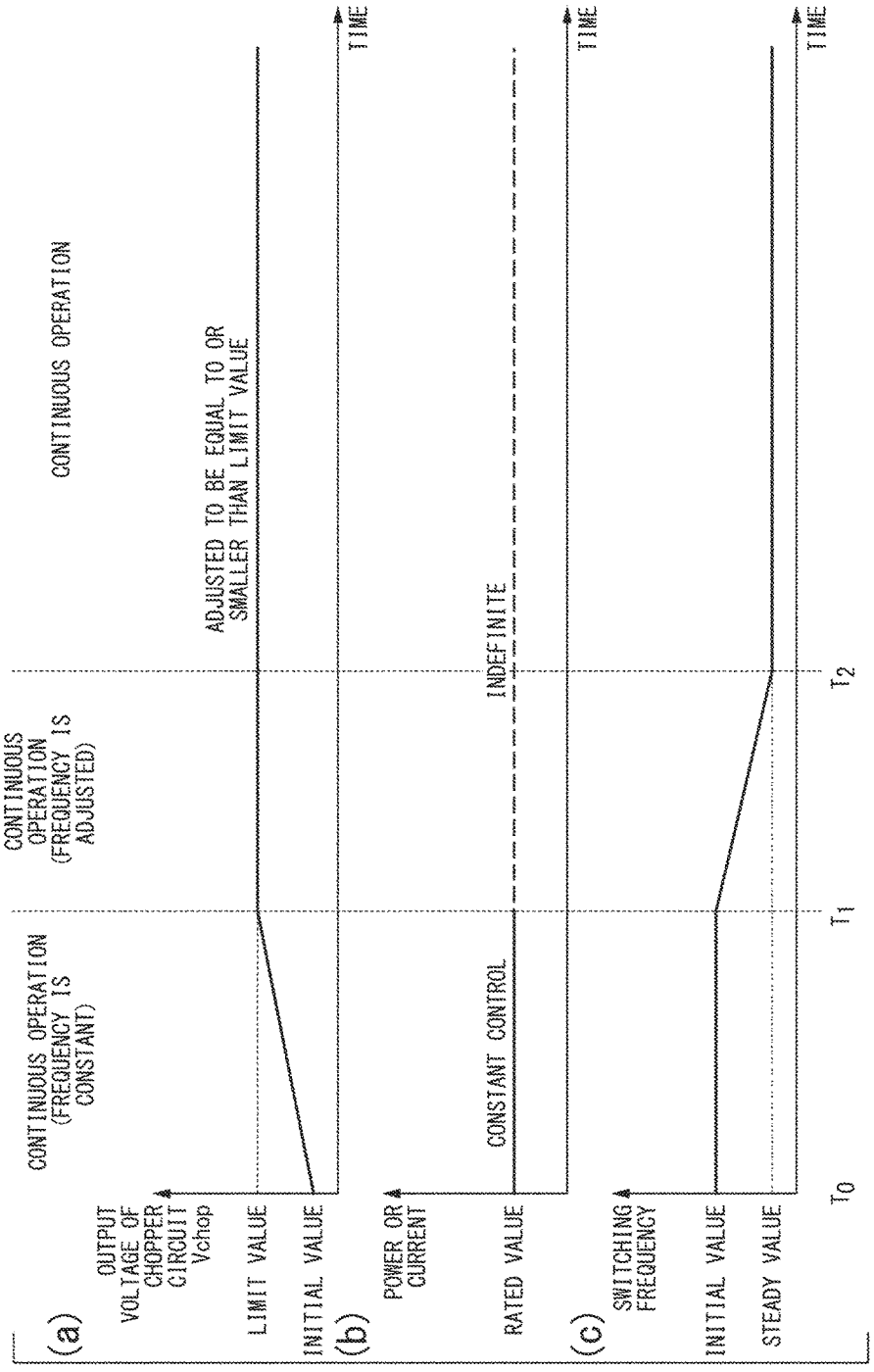
FIG. 2 is a characteristic diagram showing an operation of the wireless power-supplying system according to the embodiment of the present disclosure.

For example, when the switching control unit 7 controls the frequencies of the switching signals S1 to S4 directed to the inverter circuit 3, that is, the switching frequency of the inverter circuit 3 to be constant (see (c) of FIG. 2) in a period $T_0$-$T_1$ shown in FIG. 2, the output voltage of the chopper circuit 2 shown in (a) of FIG. 2, that is, the inter-terminal voltage of the capacitor 24 increases, and the output of the power-supplying device S shown in (b) of FIG. 2 is stabilized. However, when the inter-terminal voltage of the capacitor 24 exceeds the limit value, the switching control unit 7 decreases the switching frequencies of the switching signals S1 to S4 directed to the inverter circuit 3, as shown in the period $T_1$-$T_2$ in (c) of FIG. 2. As a result, the impedance Zinv1 or Zinv2 described above changes and the inter-terminal voltage of the capacitor 24 decreases. Also, the switching control unit 7 controls the frequencies of the switching signals S1 to S4 to be fixed to a value at which the inter-terminal voltage is below the limit value. As a result, the output voltage of the chopper circuit 2 shown in (a) of FIG. 2 stops increasing and becomes constant. Further, the output of the power-supplying device S shown in (b) of FIG. 2 is indefinite, but in this example, since the inter-terminal voltage of the element is a control target and the power or the current supplied by the power-supplying device S is not the control target, the output of the power-supplying device S may be indefinite.

Further, when it is difficult to provide the voltage measurement unit 6 in each element, for example, the voltage measurement unit 6 may be provided at a specific place (for example, any one place or two places of the chopper circuit 2 and the inverter circuit 3), and a data table in which a correspondence relationship between a detection result of the voltage measurement unit 6 and the inter-terminal voltage of each element has been registered may be stored in the switching control unit 7 in advance.

When the switching control unit 7 receives the voltage detection signal from the voltage measurement unit 6, the switching control unit 7 acquires the inter-terminal voltage of each element corresponding to the output voltage indicated by the voltage detection signal from the data table (that is, estimates the inter-terminal voltage of each element), and adjusts the switching frequency of the inverter circuit 3 so that the inter-terminal voltage of each element does not exceed the limit value while confirming the inter-terminal voltage of each element.

Further, the switching control unit 7 adjusts the switching frequency of the inverter circuit 3 so that the inter-terminal voltage of the power-receiving coil and the power-receiving capacitor of the resonance circuit 11 or the reactor (coil) and the smoothing capacitor of the rectification circuit 12 of the power-receiving device R does not exceed the limit value based on the state information of the power-receiving device R that the switching control unit 7 receives from the communication unit 5 in place of the voltage detection signal that the switching control unit 7 receives from the voltage measurement unit 6. Alternatively, the switching control unit 7 adjusts the frequencies of the respective switching signals S1 to S4 based on the inter-terminal voltage received from the voltage measurement unit 6 and the inter-terminal voltage included in the state information received via the communication unit 14 and the communication unit 5. Accordingly, the inter-terminal voltage of the element provided in the power-supplying device and the inter-terminal voltage of the element provided in the power-receiving device can be prevented from exceeding the limit value.

Second Embodiment

There is a method of adjusting a parameter of the switching signals, in addition to the method of adjusting the frequencies of the switching signals S1 to S4 directed to the inverter circuit 3 (the switching frequency of the inverter circuit 3) described above. In the second embodiment, the switching control unit 7 adjusts duty ratios of the respective switching signals S1 to S4. In other words, the switching control unit 7 adjusts a duty ratio of ON/OFF of the inverter circuit 3. In FIG. 4, the phase difference $\phi$ is 180°, and the duty ratios of the respective switching signals S1 to S4 are 50%. Here, the duty ratio refers to a ratio of a period of a high level with respect to a period of the signal. The switching control unit 7 adjusts the duty ratios of the respective switching signals S1 to S4 to be in a range of 0% to 50% based on the inter-terminal voltage received from the voltage measurement unit 6. As the duty ratios of the switching signals S1 to S4 approach 0%, the high-level period of the switching signals S1 to S4 is shortened. As a result, a period in which all the switching signals S1 to S4 are at a low level is generated, and the period increases as the duty ratio approaches 0%. As the duty ratio approaches 0%, a period in which a current flows through the inverter circuit 3 is shortened, and thus, the value of the average current on a time axis decreases. Thus, with the decrease in the value of the average current, the value of the average voltage applied to each element, that is, a value of an effective voltage also decreases in the entirety of serially connected circuits. From the above, the switching control unit 7 adjusts the duty ratios of the switching signals S1 to S4 so that the inter-terminal voltage of the element indicated by the voltage detection signal that the switching control unit 7 receives from the voltage measurement unit 6 does not exceed the limit value. Further, the switching control unit 7 may adjust the duty ratios of the switching signals S1 to S4 so that the inter-terminal voltage of the element does not exceed the limit value based on the inter-terminal voltage received from the voltage measurement unit 6 and the inter-terminal voltage included in the state information received via the communication unit 14 and the communication unit 5. Here, the limit value described above refers to a maximum value of the inter-terminal voltage at which a specific element is not damaged, similarly to the first embodiment. Alternatively, the limit value refers to a value equal to or smaller than the maximum value of the inter-terminal voltage at which a specific element is not damaged.

For example, when the voltage measurement unit 6 is provided in the switching element of the inverter circuit 3, the coil 21 and the capacitor 24 of the chopper circuit 2, or the power-supplying coil or the power-supplying capacitor of the resonance circuit 4, a duty ratio of ON/OFF of the inverter circuit 3 may be adjusted so that the inter-terminal voltages of the elements do not exceed the limit value.

Further, when it is difficult to provide the voltage measurement unit 6 in each element, the voltage measurement unit 6 may be provided at a specific place (for example, on the output side of the chopper circuit 2), and a data table in which a correspondence relationship between the output voltage of the chopper circuit 2 and the inter-terminal voltage of each element has been registered may be stored in the switching control unit 7 in advance, as described above.

When the switching control unit 7 receives the voltage detection signal from the voltage measurement unit 6, the switching control unit 7 acquires the inter-terminal voltage of each element corresponding to the output voltage of the chopper circuit 2 indicated by the voltage detection signal from the data table (that is, estimates the inter-terminal voltage of each element), and adjusts the duty ratio of ON/OFF of the inverter circuit 3 so that the inter-terminal voltage of each element does not exceed the limit value while confirming the inter-terminal voltage of each element.

Further, the switching control unit 7 adjusts the duty ratio of ON/OFF of the inverter circuit 3 so that the inter-terminal voltage of the power-receiving coil and the power-receiving capacitor of the resonance circuit 11 or the reactor (coil) and the smoothing capacitor of the rectification circuit 12 of the power-receiving device R does not exceed the limit value based on the state information of the power-receiving device R that the switching control unit 7 receives from the communication unit 5 in place of the voltage detection signal that the switching control 7 receives from the voltage measurement unit 6.

Third Embodiment

In a third embodiment, the switching control unit 7 adjusts the transformation ratio of the chopper circuit 2 (for example, the boosting ratio in the case of a boost chopper circuit) by changing the duty ratio of the switching signal supplied to the chopper circuit 2. That is, the switching control unit 7 adjusts the transformation ratio of the chopper circuit 2 by changing the duty ratio of the switching signal supplied to the transistor 23 included in the chopper circuit 2. Here, the switching signal is also a rectangular wave in which a high level and a low level are repeated. The switching control unit 7 adjusts the transformation ratio of the chopper circuit 2 so that the inter-terminal voltage of the element indicated by the voltage detection signal that the switching control unit 7 receives from the voltage measurement unit 6 does not exceed the limit value. Here, the limit value described above refers to a maximum value of the inter-terminal voltage at which a specific element is not damaged, similarly to the first and second embodiments. Alternatively, the limit value refers to a value equal to or smaller than the maximum value of the inter-terminal voltage at which a specific element is not damaged.

For example, when the voltage measurement unit 6 is provided in the capacitor 24 provided on the output side of the chopper circuit 2, the switching element of the inverter circuit 3, or the power-supplying coil or the power-supplying capacitor of the resonance circuit 4, the transformation ratio of the chopper circuit 2 is adjusted so that the inter-terminal voltages of the elements do not exceed the limit value.

Further, when it is difficult to provide the voltage measurement unit 6 in each element, the voltage measurement unit 6 may be provided at a specific place (for example, on the output side of the inverter circuit 3), and a data table in which a correspondence relationship between the output voltage of the inverter circuit 3 and the inter-terminal voltage of each element has been registered may be stored in the switching control unit 7 in advance.

When the switching control unit 7 receives the voltage detection signal from the voltage measurement unit 6, the switching control unit 7 acquires the inter-terminal voltage of each element corresponding to the output voltage of the inverter circuit 3 indicated by the voltage detection signal from the data table (that is, estimates the inter-terminal voltage of each element), and adjusts the transformation ratio of the chopper circuit 2 so that the inter-terminal voltage of each element does not exceed the limit value while confirming the inter-terminal voltage of each element.

Further, the switching control unit 7 adjusts the transformation ratio of the chopper circuit 2 so that the inter-terminal voltage of the power-receiving coil and the power-receiving capacitor of the resonance circuit 11 or the reactor (coil) and the smoothing capacitor of the rectification circuit 12 of the power-receiving device R does not exceed the limit value based on the state information of the power-receiving device R that the switching control unit 7 receives from the communication unit 5 in place of the voltage detection signal that the switching control unit 7 receives from the voltage measurement unit 6.

According to the present embodiment, it is possible to prevent damage of the element by controlling the chopper circuit 2 or the inverter circuit 3 of the power-supplying device S so that the inter-terminal voltage of the element of the power-supplying device S or the power-receiving device R does not exceed the limit value.

Further, the present disclosure is not limited to the above embodiments and, for example, the following modified examples are considered.

(1) In the above embodiment, while the chopper circuit 2 has a power factor correction function of the rectification circuit 1, this power factor correction function may be omitted.

(2) While the wireless power-supplying system conforming to a magnetic field resonance scheme has been described in the above embodiment, the present disclosure is not limited thereto. The present disclosure is also applicable to an electromagnetic induction scheme. Further, while the load is the battery B in the above embodiment, the load in the present disclosure is not limited to the battery B, and includes various power storage devices, and various devices that receive the supply of power to fulfill a predetermined function.

Figure 5:
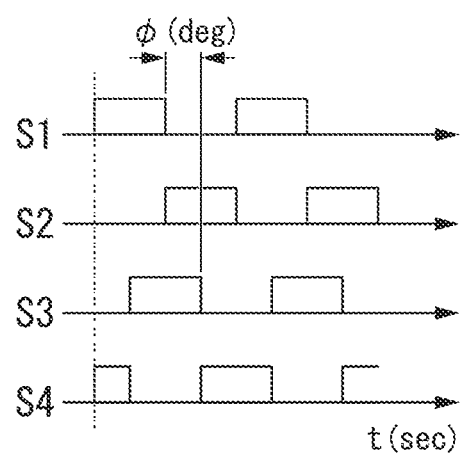
FIG. 5 is a diagram showing a timing of switching of the inverter circuit of the power-supplying device of the wireless power-supplying system according to an embodiment of the present disclosure.
Figure 6:
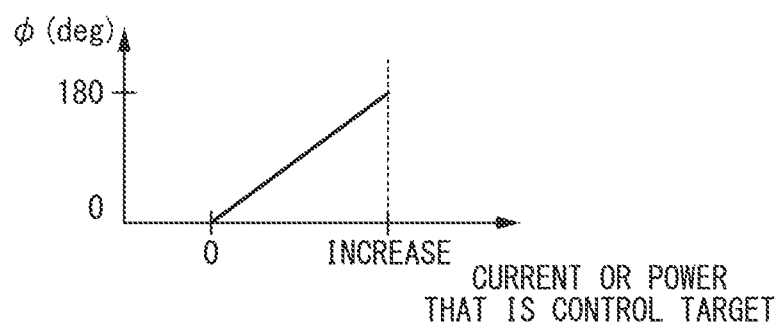
FIG. 6 is a diagram showing a power change according to a phase difference of switching of legs in the inverter circuit of the power-supplying device of the wireless power-supplying system according to an embodiment of the present disclosure.

(3) In the above embodiments, the switching frequency or the duty ratio of ON/OFF of the inverter circuit 3 is adjusted, or the transformation ratio of the chopper circuit 2 is adjusted so that the inter-terminal voltage of the element does not exceed the limit value, but the present disclosure is not limited thereto. For example, the switching control unit 7 adjusts the phase difference $\phi$ in the switching signals S1 to S4 that the switching control unit 7 supplies to the inverter circuit 3. Specifically, the switching control unit 7 adjusts the phase difference $\phi$ of the switching signal S1 and the switching signal S3. A waveform of FIG. 5 has a smaller phase difference $\phi$ than the waveform of FIG. 4. In this case, for example, a period in which high levels of the switching signal S1 and the switching signal S3 overlap and a period in which high levels of the switching signal S2 and the switching signal S4 overlap are generated. In a period in which the switching signal S1 and the switching signal S3 are both at high levels, the transistor 31 and the transistor 33 in FIG. 2 are both in an ON state, and an electric potential difference between output nodes of the inverter circuit 3 becomes 0V. Therefore, in this period, no current flows. The same applies to a period in which the switching signal S2 and the switching signal S4 are both at a high level. Therefore, as the phase difference $\phi$ decreases from 180°, the value of the average current on the time axis flowing through the inverter circuit 3 decreases. Thus, with the decrease in the value of the average current, the value of the average voltage applied to each element, that is, the value of an effective voltage also decreases in the entirety of serially connected circuits. This point is shown in FIG. 6. From the above, the switching control unit 7 may adjust the phase difference $\phi$ in the switching signals S1 to S4 so that the inter-terminal voltage of the element does not exceed the limit value based on the inter-terminal voltage received from the voltage measurement unit 6. Further, the switching control unit 7 may adjust the phase difference of the switching signals S1 to S4 so that the inter-terminal voltage of the element does not exceed the limit value based on the inter-terminal voltage received from the voltage measurement unit 6 and the inter-terminal voltage included in the state information received via the communication unit 14 and the communication unit 5. Here, the limit value described above refers to a maximum value of the inter-terminal voltage at which a specific element is not damaged, similarly to the embodiments described above. Alternatively, the limit value refers to a value equal to or smaller than the maximum value of the inter-terminal voltage at which a specific element is not damaged.

(4) In the above embodiment, the switching control unit 7 of the power-supplying device S controls the chopper circuit 2 or the inverter circuit 3 so that the inter-terminal voltage of the element of the power-supplying device S does not exceed the limit value based on the voltage detection signal that the switching control unit 7 receives from the voltage measurement unit 6, and controls the chopper circuit 2 or the inverter circuit 3 so that the inter-terminal voltage of the element of the power-receiving device R does not exceed the limit value based on the state information of the power-receiving device R that the switching control unit 7 receives from the communication unit 5. However, the present disclosure is not limited thereto.

For example, when the voltage measurement unit 13 or the communication unit 5 and the communication unit 14 are not included in the above embodiments, the switching control unit 7 controls the inter-terminal voltage of an element included only in the power-supplying device S based on the voltage detection signal that the switching control unit 7 receives from the voltage measurement unit 6. That is, the switching control unit 7 may control the chopper circuit 2 or the inverter circuit 3 so that the inter-terminal voltage of the element included only in the power-supplying device S does not exceed the limit value based on the voltage detection signal that the switching control unit 7 receives from the voltage measurement unit 6.

Further, when the voltage measurement unit 6 is not included in the above embodiments, the switching control unit 7 controls the inter-terminal voltage of an element included only in the power-receiving device R based on the state information of the power-receiving device R that the switching control unit 7 receives from the communication unit 5. That is, the switching control unit 7 may control the chopper circuit 2 or the inverter circuit 3 so that the inter-terminal voltage of the element included only in the power-receiving device R does not exceed the limit value based on the state information of the power-receiving device R that the switching control unit 7 receives from the communication unit 5.

(5) While a power source of the power-supplying device S is described as an alternating current commercial power source in the above embodiment, the present disclosure is not limited to the embodiments. For example, the power-supplying device S can receive power from a DC power source (direct current power source). Since the DC power source can supply a direct current voltage, the rectification circuit configured to convert an alternating current voltage into a direct current voltage can be omitted in an aspect in which the DC power source is used. When an output from the DC power source is converted into a desired direct current voltage, the chopper circuit is used, whereas when the output of the DC power supply is at the desired voltage, the chopper circuit can also be omitted.

(6) While the voltage converter is described as the chopper circuit in the above embodiments, the voltage converter is not limited to a non-insulation type DC-DC converter using a chopper circuit. For example, it is possible to realize the voltage converter with an insulation type DC-DC converter using a transformer or the like.

While the preferred embodiments of the present disclosure have been described above with reference to the accompanying drawings, the present disclosure is not limited to the above embodiments. Various shapes or combinations of the respective constituent members shown in the above-described embodiments are examples, and various modifications are possible based on design requirements or the like within the scope of the present disclosure.

According to the present disclosure, it is possible to prevent damage of the element of the power-supplying device by performing control so that the inter-terminal voltage of the element of the power-supplying device does not exceed the limit value.

What is claimed is:

1. A power-supplying device, comprising:
   an inverter circuit provided with a first leg formed of a first switching element and a second switching element connected in series, and a second leg formed of a third switching element and a fourth switching element connected in series;
   a resonance circuit connected to the inverter circuit and configured to transfer alternating current power to a power-receiving device in a wireless manner; and
   a switching control unit configured to perform at least one of adjusting phase differences between a switching signal that controls ON and OFF of the first switching element and a switching signal that controls ON and OFF of the third switching element, and between a switching signal that controls ON and OFF of the second switching element and a switching signal that controls ON and OFF of the fourth switching element and decreasing frequencies of the respective switching signals so that an inter-terminal voltage of a specific element constituting the inverter circuit or the resonance circuit does not exceed a predetermined limit value.

2. The power-supplying device according to claim 1, wherein the switching control unit adjusts a duty ratio of each switching signal so that the inter-terminal voltage does not exceed the predetermined limit value.

3. The power-supplying device according to claim 1, further comprising:

a communication unit connected to the switching control unit, configured to acquire state information of the power-receiving device from the power-receiving device, wherein the switching control unit adjusts at least one of the phase difference and the frequencies based on the state information of the power-receiving device.

4. A power-supplying device, comprising:

a voltage converter which receives power based on power supplied from outside;

an inverter circuit connected to the voltage converter and provided with a first leg formed of a first switching element and a second switching element connected in series, and a second leg formed of a third switching element and a fourth switching element connected in series;

a resonance circuit connected to the inverter circuit and configured to transfer alternating current power to a power-receiving device in a wireless manner; and a switching control unit configured to control the inverter circuit so that an inter-terminal voltage of a specific element constituting the voltage converter, the inverter circuit, or the resonance circuit does not exceed a predetermined limit value, wherein the switching control unit configured to perform at least one of adjusting phase differences between a switching signal that controls ON and OFF of the first switching element and a switching signal that controls ON and OFF of the third switching element, and between a switching signal that controls ON and OFF of the second switching element and a switching signal that controls ON and OFF of the fourth switching element, and decreasing respective frequencies of the respective switching signals so that the inter-terminal voltage does not exceed a predetermined limit value.

5. A wireless power-supplying system, comprising:

a power-supplying device including an inverter circuit, a first resonance circuit connected to the inverter circuit provided with a first leg formed of a first switching element and a second switching element connected in series, and a second leg formed of a third switching element and a fourth switching element connected in series and configured to transfer alternating current power to a power-receiving device in a wireless manner, and a switching control unit configured to perform at least one of adjusting phase differences between a switching signal that controls ON and OFF of the first switching element and a switching signal that controls ON and OFF of the third switching element, and between a switching signal that controls ON and OFF of the second switching element and a switching signal that controls ON and OFF of the fourth switching element and decreasing the respective frequencies of the switching signals so that a first inter-terminal voltage of a specific element constituting the inverter circuit or the first resonance circuit does not exceed a predetermined limit value;

a second resonance circuit configured to receive the alternating current power from the power-supplying device in a wireless manner; and a rectification circuit connected to the second resonance circuit and configured to supply power to a battery.

6. The wireless power-supplying system according to claim 5, wherein the power-receiving device further includes a measurement unit that measures a second inter-terminal voltage of a specific element constituting the second resonance circuit or the rectification circuit;

a control unit connected to the measurement unit and configured to supply the second inter-terminal voltage; and a second communication unit connected to the control unit and configured to supply the second inter-terminal voltage to the power-supplying device, the power-supplying device further includes a first communication unit connected to the switching control unit and configured to acquire the second inter-terminal voltage from the power-receiving device, and the switching control unit adjusts the phase difference and decreases the frequencies based on the second inter-terminal voltage of the power-receiving device.

7. The wireless power-supplying system according to claim 5, wherein the switching control unit adjusts a duty ratio of each switching signal so that the first inter-terminal voltage does not exceed a predetermined limit value.

* * * * *